United States Patent [19]

Usui et al.

[11] Patent Number: 5,265,793
[45] Date of Patent: Nov. 30, 1993

[54] SMALL THICK-WALLED COMPOSITE METAL TUBING AND PROCESS OF PRODUCING THE SAME

[75] Inventors: Masayoshi Usui; Yuzo Hitachi; Seiya Takahata, all of Shizuoka, Japan

[73] Assignee: Usui Kokusai Sangyo Kabushiki Kaisha, Shizuoka, Japan

[21] Appl. No.: 997,839

[22] Filed: Dec. 29, 1992

Related U.S. Application Data

[63] Continuation of Ser. No. 468,714, Jan. 24, 1990, abandoned.

[30] Foreign Application Priority Data

Feb. 7, 1989 [JP] Japan ................................. 1-26719

[51] Int. Cl.⁵ .............................................. B21C 37/06
[52] U.S. Cl. .................................... 228/127; 228/131; 138/143; 138/145; 427/239
[58] Field of Search .................. 138/142, 141–143, 138/145, 146; 228/126, 127, 131, 193, 214, 263.15; 427/239

[56] References Cited

U.S. PATENT DOCUMENTS

| | | |
|---|---|---|
| 798,056 | 8/1905 | Nicholson . |
| 1,306,690 | 6/1919 | Gillespie . |
| 4,449,281 | 5/1984 | Yoshida et al. . |
| 4,784,311 | 11/1988 | Sugao . |
| 4,886,203 | 12/1989 | Puzrin et al. . |

FOREIGN PATENT DOCUMENTS

| | | |
|---|---|---|
| 15134 | 5/1970 | Japan . |
| 19958 | 2/1978 | Japan . |
| 55-7892 | 6/1977 | U.S.S.R. . |

OTHER PUBLICATIONS

Union Carbide, "HAYNES Diffusion Coatings", Haynes, Stellite Co., 1961.
Bendix Technical Journal, "Diffusion Bonding of Metals", pp. 24–40, 1969.

Primary Examiner—Samuel M. Heinrich
Attorney, Agent, or Firm—Lowe, Price, LeBlanc & Becker

[57] ABSTRACT

A small thick-walled composite metal fuel injection tubing for a diesel engine, for example, is manufactured from an outer carbon steel pipe, and an inner stainless steel pipe press-fitted in the large diameter carbon steel pipe by drawing. The press-fitted mating surfaces of the inner and outer pipes are metallurgically and integrally bonded together by heat-treating. As a result, at least an inside wall surface of the inner stainless steel pipe has a diffused layer of at least one kind of metal, or an alloy of two or more kinds, of metals in combination, selected from the group consisting of Ni, Cr, Mo, Co, Al and Cu.

12 Claims, 1 Drawing Sheet

SMALL THICK-WALLED COMPOSITE METAL TUBING AND PROCESS OF PRODUCING THE SAME

This application is a continuation of application Ser. No. 07/468,714 filed Jan. 24, 1990, now abandoned.

BACKGROUND OF THE INVENTION

1) Field of the Invention

This invention relates to a high pressure fuel injection pipe for a fuel supply passage of a diesel engine, and more particularly to a small thick-walled metal fuel injection tubing having an outside diameter of at most about 30 mm and having its outer and inner tubular members metallurgically press-fitted on each other, which is excellently resistant to cavitation erosion and pressure. The invention relates also to a process of producing the small thick-walled metal fuel injection tubing.

2) Description of the Related Art

Generally, in a high pressure fuel injection pipe of the described type such as for a diesel engine, high pressure fuel flows inside the injection pipe under the conditions, i.e. an injection time of about 5 milliseconds, a flow speed of at most about 15 m/sec and an internal pressure of 200–600 kg/cm² (peak pressure); either flow speed or internal pressure fluctuates frequently and sharply.

As can be seen in, for example, a tubing for a high pressure fuel pipe, this type of composite metal tubing has heretofore been formed by a procedure which comprises the press-fitting of large and small diameter high pressure piping carbon steel pipes (JIS G 3455 STS 38), each having a copper plating film preliminarily provided around the circumferential mating surface thereof, and subsequent heat-treating of them to effect mutual brazing with the copper plating films as the filler which are present around the circumferential mating surfaces, or by a simple procedure which comprises inserting one of two pipes having mutually different diameters into the other and mutually press-fitting them by solid drawing or the like.

However, according to the former of these conventional procedures, complicated steps are needed because copper plating must be applied around the inner surface and the outer surface of the pipes. If the brazing is inadequate, the mutually press-fitted mating circumferential surfaces undergoes a relaxture phenomenon to create a gap from which portion a possible breakage due to fatigue tends to progress. Yet if the brazing is adequate, only a limited degree of resistance against vibration can be obtained as the base metal becomes soft due to the heat during brazing. Therefore an excellent composite fuel injection tubing cannot be achieved.

According to the latter conventional procedure, because the resulting configuration has the mating faces simply subjected to press-fitting, the mating circumferential interface disadvantageously undergoes a relaxture phenomenon leading to reduction of the mechanical strength when the composite tubing is used as a fuel injection pipe. Coupled with vibration during rotation of an engine, this often gives rise to cracking or breakage.

As countermeasures have been made in recent years in increasing the power as well as in reducing NOx and minimizing black smoke, the tendency of highly pressurizing fuel is particularly on the rise. A high pressure fuel injection tubing has thus been demanded which can be used under the conditions, e.g. an injection time of 1-2 milliseconds, a flow speed of at most about 50 m/sec and an internal pressure of 600–1,000 kg/cm² (peak pressure). Consequently, under such severe conditions, a high pressure fuel injection pipe most highly requires (1) durability against fatigue due to the repeated high pressure loading, (2) resistance to cavitation erosion, and (3) resistance against vibration from the vehicle body. So safety measures against cracking and breakage of the injection pipe has been very significant.

To this end, as an attempted measure against the severe conditions, it has been proposed that a small diameter thick-walled pipe having a wall thickness of 25–40% of its outside diameter is used for the inner tubular member of a high pressure fuel injection pipe, that the inner wall surface of the inner tubular member has no irregular wavy swells which would be a cause for development of fuel eddy resistance, and that there is eliminated a gap, between the thick-walled inner tubular member and the outer tubular member, which would cause a breakage of the inner tubular member and/or fuel leak. However, this increased eddy resistance creates cavitation erosion in the inner wall surface of the inner tubular member, thus resulting in a breakage of the inner tubular member.

Therefore, a fuel injection pipe for diesel engine usable in safety under the above-mentioned severe conditions has not yet been developed for the present.

SUMMARY OF THE INVENTION

It is therefore an object of this invention to provide a small thick-walled composite fuel injection tubing, for diesel engines in particular, which is excellent in resistance to cavitation and in resistance against pressure even under severe conditions.

According to a first aspect of this invention, there is provided a small thick-walled composite metal fuel injection tubing comprising: an outer carbon steel pipe; and an inner stainless steel pipe press-fitted in said large diameter carbon steel pipe by drawing, the press-fitted mating surfaces of said inner and outer pipes being metallurgically and integrally bonded together, at least an inside wall surface of said inner stainless steel pipe having a diffused layer of at least one kind of metal, or an alloy of two or more kinds of metals in combination, selected from the group consisting of Ni, Cr, Mo, Co, Al and Cu.

According to a second aspect of this invention, there is provided a process of producing a small thick-walled composite metal fuel injection tubing, comprising the steps of: press-fitting an inner stainless steel pipe in an outer carbon steel pipe by drawing, the inner stainless steel pipe having a coating layer of at least one kind of metal, or an alloy of two or more kinds of metals in combination, selected from the group consisting of Ni, Cr, Mo, Co, Al and Cu; and then heat treating the resulting press-fitted inner and outer pipes in a furnace in non-oxidizing atmosphere or a vacuum furnace to effect diffusion bonding of the mating surfaces of said inner and outer pipes to form a diffused layer of said metal or alloy on at least an inner wall surface of said inner pipe.

The above and other advantages, features and additional objects of this invention will be manifest to those versed in the art upon making reference to the following detailed description and the accompanying drawings in which a preferred embodiment incorporating the principles of this invention is shown by way of illustrative example.

BRIEF DESCRIPTION OF THIS INVENTION

DETAILED DESCRIPTION

Figure 1:
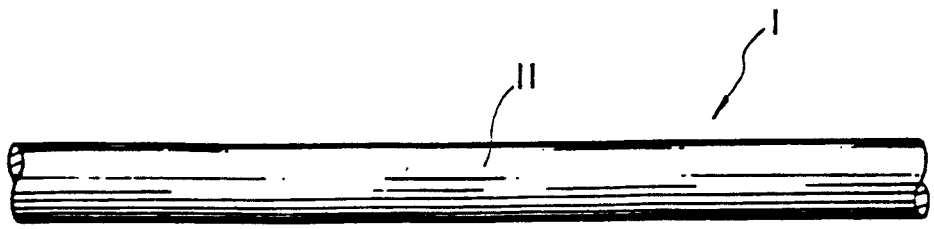
FIG. 1 is a fragmentary plan view of a small thick-walled fuel injection tubing according to this invention.
Figure 2:
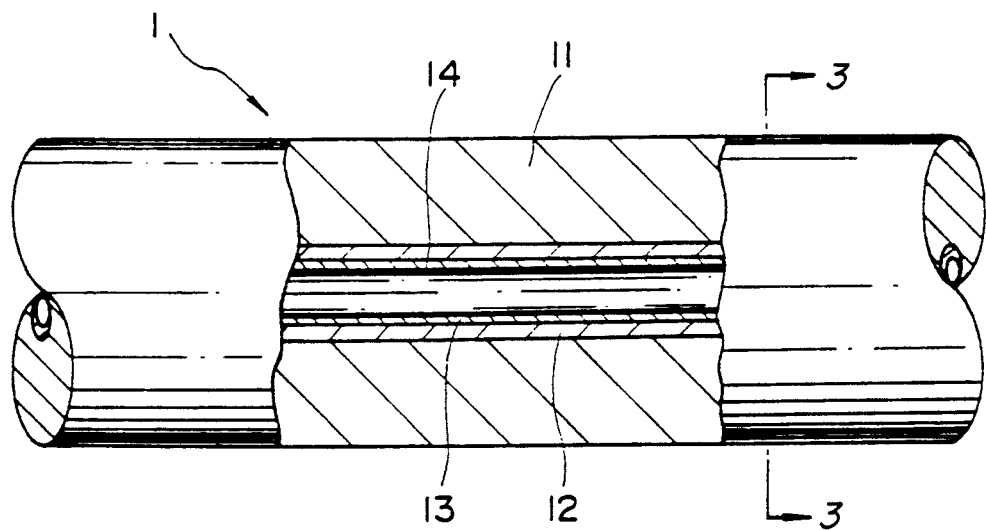
FIG. 2 is an enlarged view, partially broken away, of FIG. 1.
Figure 3:
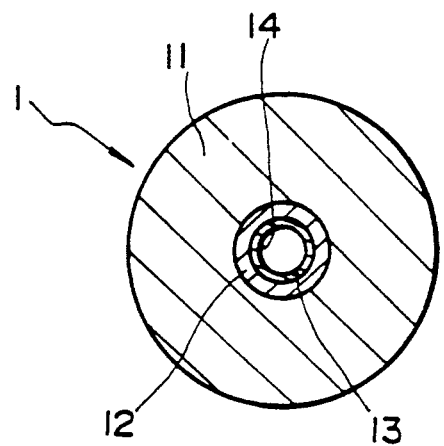
FIG. 3 is a cross-sectional view taken along line A—A of FIG. 2.

The principles of this invention are particularly useful when embodied in a small thick-walled composite fuel injection tubing (hereinafter called "composite injection tubing") such as shown in FIGS. 1, 2 and 3, generally designated by the numeral 1.

As shown in FIGS. 2 and 3, the composite injection tubing 1 is a double metal pipe composed of an outer tubular member 11 and an inner tubular member 12 inserted in and through the outer tubular member 11, the inner tubular member 12 having over its inner wall surface a diffused layer 13. Alternatively, the diffused layer may be disposed over the outer peripheral surface of the inner tubular member 12, namely, at the boundary interface contacting the mating outer and inner tubular members 11, 12.

In this invention, a carbon steel pipe (e.g., JIS G 3455 STS 38 and JIS G 3455 STS 42) is used as the outer tubular member 11 particularly from a view point of resistance against pressure, while a stainless steel pipe (e.g., JIS G 3459 SUS 304TP, SUS 304LTP) is used as the inner tubular member 12 from a view point of resistance to cavitation erosion.

The chemical compositions of the above-mentioned carbon steel and stainless steel are shown in Table 1.

TABLE 1

(Chemical Composition of Outer and Inner Pipes)

| Material | Chemical Composition | | | | | | |
|---|---|---|---|---|---|---|---|
| | C | Si | Mn | P | S | Ni | Cr |
| STS 38 | at most 0.25 | 0.10–0.35 | 0.30–1.10 | at most 0.035 | at most 0.035 | | |
| SUS304 TP | at most 0.08 | at most 1.00 | at most 2.00 | at most 0.04 | at most 0.03 | 8.00–11.00 | 18.00–20.00 |

For passage of high pressure fuel in safety, the composite injection tubing 1 in the form of a double metal pipe has preferably an outside diameter of at most 30 mm and a wall thickness of 25–40% of the outside diameter. The outside diameter and thickness are easily determined from those widely used in the art, and may be determined each to a predetermined value as desired.

In the manufacture of a high pressure fuel injection tubing 1, it is important that a gap should not be created between the outer and inner tubular members and also that any wavy swell should not be created on the inner wall surface 14 of the injection tubing, namely, any passage resistance should not be created on the fuel passage, wall surface to the utmost in view of resistance to cavitation erosion.

From the view point of manufacturing process of the composite injection tubing as a double metal pipe, a gap between the outer and inner tubular members and irregular swells or waves on the inner wall surface 14 of the injection tubing are created when the outer and inner tubular members are press-fitted by drawing to reduce their diameters and particularly when the press-fitted outer and inner tubular members are reformed by reforming rollers after heat-treating (practically, a double metal pipe would be deformed sharply when heat-treated). Keeping the actual conditions of such manufacturing process in mind, the present inventors found that it is important to restrict the thickness of the inner tubular member 12 so as not to create any gap between the outer and inner tubular members and any irregular swells on the inner wall surface of the injection pipe. For the composite injection tubing 1 of this invention, the thickness of a stainless steel pipe as the inner tubular member 12 should be preferably 1.5%–8.5% of the outside diameter of the entire double metal pipe.

This Figure has been determined for the following reason. If the thickness of the inner tubular member 12 exceeds 8.5%, the tendency of creating a large gap between the outer and inner tubular members increases sharply with the plastic deformation toward the axis of the outer tubular member 11 due to the reforming during the press-fitting after the drawing and before diffusion by heat treatment. If the thickness of the inner tubular member 12 does not exceed 1.5%, the tendency of creating irregular or wavy swells on the inner wall surface 14 of the flow passage of the inner tubular member increases sharply due to the roller traces during the reforming.

For the most significant feature of this invention, at least the inner wall surface of the inner tubular member 12 has a diffused layer of at least one kind of metal, or an alloy of two or more kinds of metals in combination, selected from the group consisting of Ni, Cr, Mo, Co, Al and Cu. Alternatively, the diffused layer may be disposed on the outer wall surface of the inner tubular member 12, i.e., at the mutual boundary interface between the mating outer and inner tubular members 11, 12, in which case the metal of alloy is diffused around the boundary surface between the outer and inner tubular members 11, 12, thus serving to assist in joining the two tubular members together with increased firmness.

For forming a diffused layer of the above-mentioned metal or alloy, a coating of the metal or alloy is formed over the inner wall surface 14 of the inner tubular member 12 beforehand such as by plating, whereupon the outer and inner tubular members 11, 12 are press-fitted and then heat-treated. Alternatively, using a stainless hoop or band steel (for forming the inner tubular member) coated beforehand with the above-mentioned metal or alloy by plating or cladding, the inner tubular member is produced, and the inner tubular member is then heat-treated to form a diffused layer of the metal or alloy. The method of forming a diffused layer should by no means be limited to the illustrated examples.

Forming a coating of the above-mentioned metal or alloy over the inner wall surface of the inner tubular member 12 or over both the inner and outer wall surfaces thereof may be accomplished by chemical plating. Further, the thickness of the coating may be usually 1–20 μm and should by no means be limited to this Figure.

In this invention, the outer and inner tubular members 11, 12 are press-fitted, whereupon the outer and inner tubular members 11, 12 are heat-treated in a vacuum furnace, or a furnace in non-oxidizing or reducing atmosphere, as the mating boundary surfaces of the outer and inner tubular members 11, 12 are bonded together metallurgically and integrally. By the heat treatment at that time, the diffusion layer also is formed.

The heat treating conditions in a vacuum furnace, or a furnace in reducing atmosphere, after the above-mentioned press-fitting, may be sufficient if they enable to metallurgically unify the mating boundary surfaces of the outer and inner tubular members; they may be conducted usually at 700°–1,200° C. for 1–30 minutes.

The small thick-walled composite fuel injection tubing of this invention causes the following results:

(i) Since a diffused layer of Ni is formed around the inner wall surface of the inner tubular member, a high-hardness inner wall surface can be obtained so that resistance to cavitation erosion and resistance against pressure is improved.

(ii) Since the press-fitted mating surfaces of the outer tubular member (carbon steel pipe) and the inner tubular member (stainless steel pipe) are bonded together with increased firmness by diffusion, these two tubular members can hardly be separated during bending and pressing. In general, if a gap is created between the outer and inner tubular members, the inner tubular member will be broken for a short time due to a sudden fluctuation of pressure of high pressure fuel; according to this invention, however, no such gap can be created.

(iii) Generally, in the manufacture of this kind of composite fuel injection tubing, wavy and irregular swells are created on the inner wall surface of the inner tubular member due to the shaping force, particularly the shaping pressure applied during the reforming at the final stage of the process, thus lowering resistance to cavitation erosion. With the arrangement of this invention, however, since occurrence of any irregular swell on the inner wall surface of the inner tubular member can be prevented by restricting the thickness of the inner tubular member, it is possible to improve resistance to cavitation erosion and proofness against pressure.

EXAMPLES

Examples of this invention will now be described; but this invention should by no means be limited to these specific examples.

EXAMPLE 1

A carbon steel pipe of STS 38 (outside diameter of 10 mm, inside diameter of 5 mm) was used as the outer tubular member. A stainless steel pipe of SUS 304 (outside diameter of 5 mm, thickness of 0.5 mm) having on its inner wall surface an Ni-plating layer of 7 $\mu$m thickness was used as the inner tubular member.

After having cleaned, the outer and inner tubular members, and particularly after having removed pollutants such as oils, carbon scales from the inner circumferential surface of the outer tubular member and the outer circumferential surface of the inner tubular member, the inner tubular member was inserted in and through the outer tubular member. Then, by drawing with a drawing bench, the outer and inner tubular members were mutually fitted to provide a double metal pipe having an outside diameter of 6.35 mm and an inside diameter of 2.0 mm.

Subsequently, the double metal pipe was heat-treated at 1,100° C. for 5 minutes in a continuously operating furnace in non-oxidizing atmosphere to join the mating surfaces of the outer and inner tubular members together metallurgically and integrally, and also to form an Ni-rich, excellent-fatigue-strength, high-hardness diffused layer in which an Ni-plating layer was diffused around the inner wall surface of the inner tubular member. The resulting double metal pipe was subjected to desired subsequent processes, such as forming a head for connection. As a result, a high pressure composite fuel injection tubing suitable for a diesel engine was obtained, which tubing was excellent in resistance to cavitation erosion as well as in resistance against pressure, compared with the conventional tubings. Specifically, in a single-member injection tubing (conventional art) made of annealed STS 38 and having the above-mentioned outside diameter and thickness, a cavitation erosion test was conducted under such an injecting condition that the pressure waveform in the tubing creates cavitation erosion was at most 0.6 mm. As a result, no cavitaion erosion was created at all on the inner wall surface of the single-layer injection tubing. Further, a characteristic of fatigue-proofness with repeated-high-pressure increased to 2.4 times as compared the conventional tubing. In a bending fatigue test regarded as a so-called "5.8 bending fatigue test" of JA SOM 104 "brake tube test method", vibration-proofness increased by 15%.

EXAMPLE 2

A double metal pipe was obtained in exactly the same manner as Example 1, except that the stainless pipe as the inner tubular member was manufactured from a stainless hoop (band steel). Specifically, the inner tubular member was obtained by forming an Ni-plating layer of 1 $\mu$m thickness and then a Cr-plating layer of 6 $\mu$m thickness on the stainless hoop, then shaping the plated stainless hoop into a tube, and finally plug-drawing the tube. Also, the inner tubular member was obtained from a clad band steel having an Ni layer of the same thickness. A high pressure composite fuel injection tubing was obtained from the resulting double metal pipe, which tubing was excellent in resistant to cavitation erosion and in resistance against pressure, like the tubing of Example 1.

What is claimed is:

1. A small thick-walled composite metal fuel injection tubing comprising:
   (a) an outer carbon steel pipe;
   (b) an inner stainless steel pipe press-fitted in said large diameter carbon steel pipe by drawing, the press-fitted mating surfaces of said inner and outer pipes being metallurgically and integrally bonded together, at least an inside wall surface of said inner stainless steel pipe having a film coating layer selected from the group consisting of an elemental nickel and a dual layer structure of an elemental nickel layer adjacent a metal layer, said metal selected from the group consisting of Cr, Mo, Co, and Cu; and
   (c) a diffused layer of said film coating at an interface between said film coating and said inside wall surface.

2. The small thick-walled composite metal fuel injection tubing of claim 1,
   wherein said inner stainless steel pipe has a thickness which is 1.5% to 8.5% of the outside diameter of said composite metal fuel injection tubing.

3. The small thick-walled composite metal fuel injection tubing of claim 1,
   wherein said inner stainless steel pipe has a thickness which is 1.5% to 8.5% of the outside diameter of said composite metal fuel injection tubing, wherein said composite metal fuel injection tubing has an outside diameter smaller than 30 mm, and wherein said composite metal fuel injection tubing has a thickness which is 25% to 40% of the outside diameter of said composite metal fuel injection tubing.

4. The composite tubing of claim 1, wherein said film coating is said dual layer structure, said dual layer structure being plated on said inner pipe before drawing.

5. The composite tubing of claim 1, wherein said film coating is said dual layer structure and said metal layer is Cr.

6. The composite tubing of claim 2, wherein said film coating is said dual layer structure and said metal is Cr.

7. The composite tubing of claim 3, wherein the thickness of the diffused layer is 1 to 20 $\mu$m.

8. The composite tubing of claim 4, wherein the thickness of the diffused layer is 1 to 20 $\mu$m.

9. The composite tubing of claim 3, wherein said film coating is said dual layer structure and said metal layer is Cr.

10. The composite tubing of claim 1, wherein said film coating is plated on said inner pipe before drawing.

11. The composite tubing of claim 2, wherein said film coating is plated on said inner pipe before drawing.

12. The composite layer tubing of claim 3, wherein said film coating is plated on said inner pipe before drawing.

* * * * *